(12) United States Patent
Pasternack

(10) Patent No.: US 12,475,357 B2
(45) Date of Patent: Nov. 18, 2025

(54) DYNAMIC UTILITY FUNCTIONS FOR INFERENCE IN MACHINE-LEARNED MODELS

(71) Applicant: Microsoft Technology Licensing, LLC, Redmond, WA (US)

(72) Inventor: Jeffrey William Pasternack, Fremont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1199 days.

(21) Appl. No.: 17/342,356

(22) Filed: Jun. 8, 2021

(65) Prior Publication Data

US 2022/0391671 A1   Dec. 8, 2022

(51) Int. Cl.
*G06N 3/045* (2023.01)
*G06F 16/9538* (2019.01)
*G06N 5/04* (2023.01)
*G06N 20/00* (2019.01)

(52) U.S. Cl.
CPC ......... *G06N 3/045* (2023.01); *G06F 16/9538* (2019.01); *G06N 5/04* (2013.01); *G06N 20/00* (2019.01)

(58) Field of Classification Search
CPC ........ G06N 3/045; G06N 3/0455; G06N 5/04; G06N 20/00; G06F 16/9538
See application file for complete search history.

(56) References Cited

U.S. PATENT DOCUMENTS

| | | | |
|---|---|---|---|
| 11,163,845 B2 * | 11/2021 | Liu | G06N 3/045 |
| 11,244,015 B1 * | 2/2022 | Zhuang | G06F 16/355 |
| 11,443,202 B2 * | 9/2022 | Joglekar | G06N 20/00 |
| 11,682,060 B2 * | 6/2023 | Chaidaroon | G06F 16/24578 |
| | | | 705/26.7 |

(Continued)

FOREIGN PATENT DOCUMENTS

| | | | | |
|---|---|---|---|---|
| WO | WO-2019113257 A1 * | 6/2019 | | G06F 16/24578 |
| WO | WO-2021221828 A1 * | 11/2021 | | G06F 16/24578 |

OTHER PUBLICATIONS

Li et al., "Deep Interest-Shifting Network with Meta-Embeddings for Fresh Item Recommendation", Oct. 28, 2020, Wiley, pp. 1-13 (Year: 2020).*

(Continued)

*Primary Examiner* — Paulinho E Smith
(74) *Attorney, Agent, or Firm* — Cantor Colburn LLP; Renee D. Brown (57) ABSTRACT

In an example embodiment, a technique is presented that accesses training data that includes information about items, queries for items, and labels for the combinations of items and queries. The labels may correspond to different events, and there may be multiple different labels for the same combination of item and query. A machine learned model is then trained to learn a function for embedding each item to which a label pertains and a function for embedding each query to which a label pertains. Then, for each item in the training data, the items are embedded using the machine learned model, and the item embeddings for the item are concatenated into a single item embedding. At inference time, a similar concatenation is performed for multiple query embeddings. The concatenated embeddings are then used as input to an approximate k-nearest neighbor search function.

16 Claims, 7 Drawing Sheets

(56) References Cited

U.S. PATENT DOCUMENTS

| | | | | |
|---|---|---|---|---|
| 2007/0203908 | A1* | 8/2007 | Wang | G06F 16/3331 |
| | | | | 707/E17.069 |
| 2011/0029517 | A1* | 2/2011 | Ji | G06F 16/951 |
| | | | | 706/45 |
| 2019/0188295 | A1* | 6/2019 | Sirotkovic | G06F 16/2425 |
| 2019/0378048 | A1* | 12/2019 | Shrivastava | G06F 16/90335 |
| 2020/0004835 | A1* | 1/2020 | Ramanath | G06F 16/24578 |
| 2020/0004886 | A1* | 1/2020 | Ramanath | G06F 16/248 |
| 2020/0005134 | A1* | 1/2020 | Ramanath | G06N 3/045 |
| 2021/0110208 | A1* | 4/2021 | Ahmadvand | G06F 16/9535 |
| 2021/0312134 | A1* | 10/2021 | Creed | G06N 20/00 |
| 2021/0312237 | A1* | 10/2021 | Duan | G06Q 30/02 |
| 2022/0335066 | A1* | 10/2022 | Hedayati | G06N 20/00 |
| 2022/0391435 | A1* | 12/2022 | Xie | G06F 16/90335 |
| 2025/0021792 | A1* | 1/2025 | Hsieh | G06N 3/044 |

OTHER PUBLICATIONS

Li et al., "From Semantic Retrieval to Pairwise Ranking: Applying Deep Learning in E-Commerce Search", Jul. 25, 2019, SIGIR 2019, pp. 1383-1384. (Year: 2019).*

* cited by examiner

DYNAMIC UTILITY FUNCTIONS FOR INFERENCE IN MACHINE-LEARNED MODELS

TECHNICAL FIELD

The present disclosure generally relates to technical problems encountered in machine learning. More specifically, the present disclosure relates to dynamic utility functions for inference in machine-learned models.

BACKGROUND

The rise of the Internet has occasioned two disparate yet related phenomena: the increase in the presence of online networks, with their corresponding user profiles visible to large numbers of people, and the increase in the use of these online networks for various reasons. The result is that a large number of people often interact with various pieces of information on the Internet. For example, search engines or feed engines often return a number of different information results to a graphical user interface, for display to a user (who may or may not have explicitly searched for information). While in the past many interactions with these pieces of information were of only one interaction type (e.g., the user would select or "click" on one of the results to obtain more details/link to an information source), modern graphical user interfaces often allow for multiple types of interaction with the same piece of information. For example, a user may elect to click on a result, share a result, like a result, favorite a result, etc.

One factor that may be used by search engines, feed engines, or the like, when determining which result/recommendation to return to a graphical user interface is the likelihood that the user will interact with the result/recommendation. Various techniques have been developed that use machine learning to predict a likelihood that a user will interact with a result/recommendation and then use this prediction as a factor (along with, for example, relevance of the result/recommendation) when scoring/ranking the recommendation. A technical challenge exists, however, with respect to predicting likelihoods that a user will perform various different types of interactions on the same result/recommendation.

BRIEF DESCRIPTION OF THE DRAWINGS

Some embodiments of the technology are illustrated, by way of example and not limitation, in the figures of the accompanying drawings.

DETAILED DESCRIPTION

Overview

In an example embodiment, a technique is presented that accesses training data that includes information about items, queries for items, and labels for the combinations of items and queries. The labels may correspond to different events, and there may be multiple different labels for the same combination of item and query. A machine learned model is then trained to learn a function for embedding each item to which a label pertains and a function for embedding each query to which a label pertains. Then, for each item in the training data, the items are embedded using the machine learned model, and the item embeddings for the item are concatenated into a single item embedding. At inference time, a similar concatenation is performed for multiple query embeddings. The concatenated embeddings are then used as input to an approximate k-nearest neighbor search function.

This technique specifically addresses issues with prior art machine learned models designed to handle the same problem. More particularly, techniques such as two-tower embedding may be used to learn embeddings for combinations of items and queries, and then the output of these two-tower embeddings may be input into an approximate k-nearest neighbor search function to calculate a set of items that the function has determined to be the highest scoring. This aids in solving the technical problem of poor reliability in prior art machine learned models in predicting likelihoods that a user will perform various different types of interactions on the same result/recommendation.

Description

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

The disclosed embodiments provide a method, apparatus, and system for providing a machine learned model to recommend or return items based on a query, in an online network.

Figure 1:
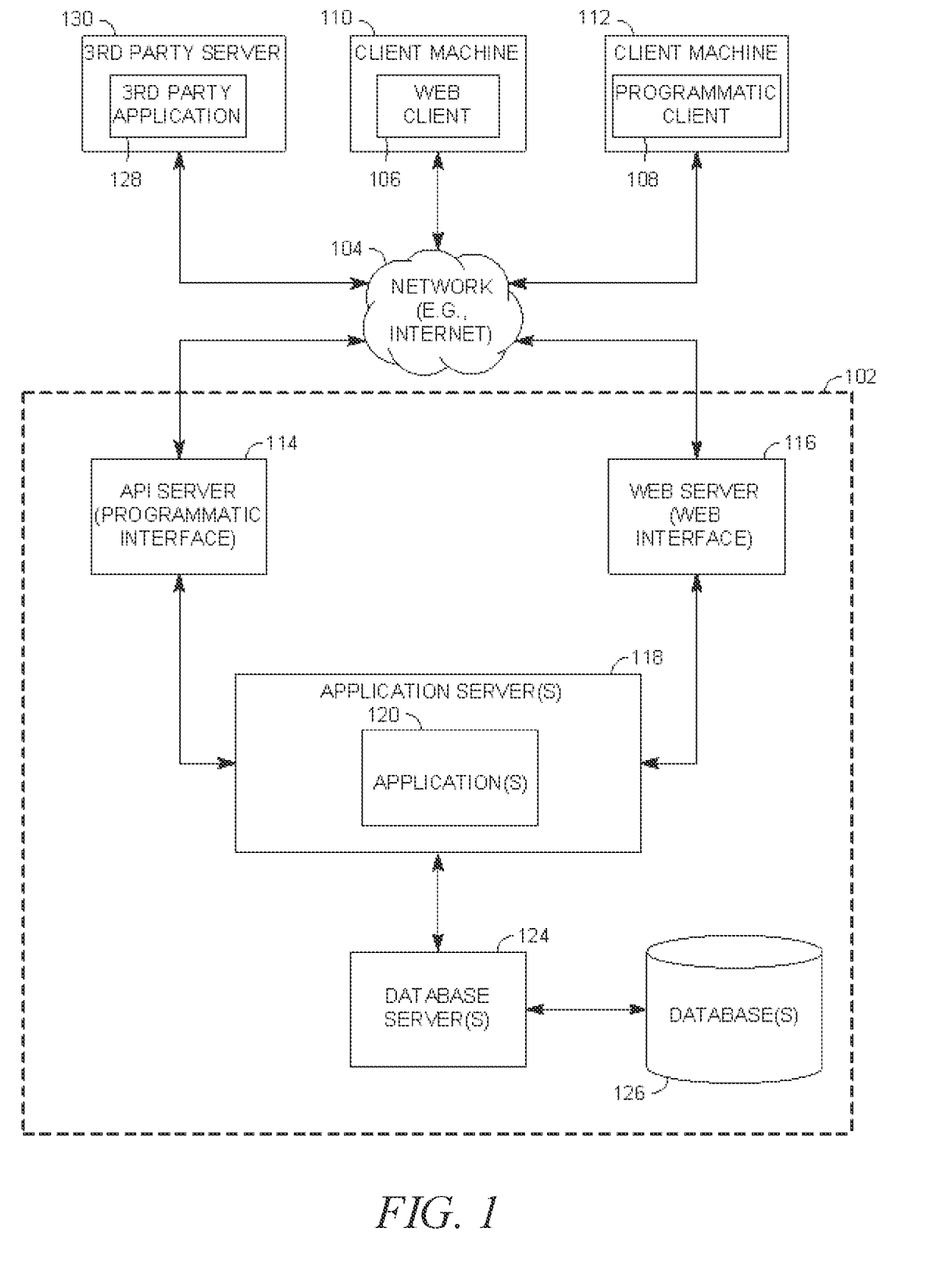
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
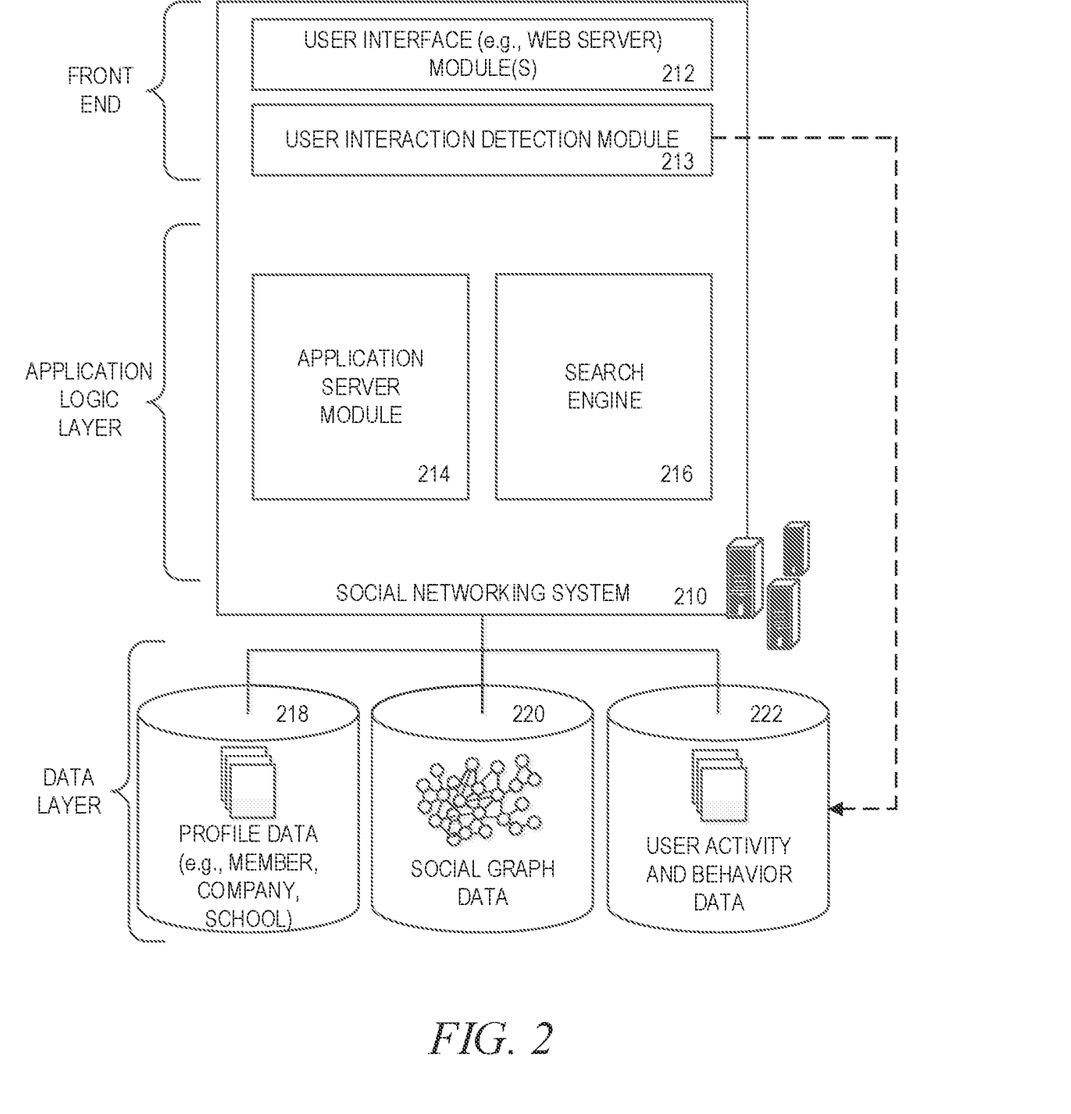
FIG. 2 is a block diagram showing the functional components of an online network, including a data processing module referred to herein as a search engine, for use in generating and providing search results for a search query, consistent with some embodiments of the present disclosure.

In some embodiments, the networked system 102 may comprise functional components of an online network. FIG. 2 is a block diagram showing the functional components of an online network, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online network.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the online network, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the online network, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the online network. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following or a connected user (e.g., friend or link) will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the online network, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, a social networking system 210 provides an API module via which applications 120 and services can access various data and services provided or maintained by the online network. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online network, nothing other than data privacy concerns prevents the API from being provided to the public or to certain third parties under special arrangements, thereby making the navigation recommendations available to third-party applications 128 and services.

Although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the online network, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Two-tower embeddings utilize a single neural network that combines two neural networks, one that maps query features to query embeddings and one that maps item features to an item embedding. The output of the combination neural network is a dot product of the outputs of the two individual neural networks.

Figure 3:
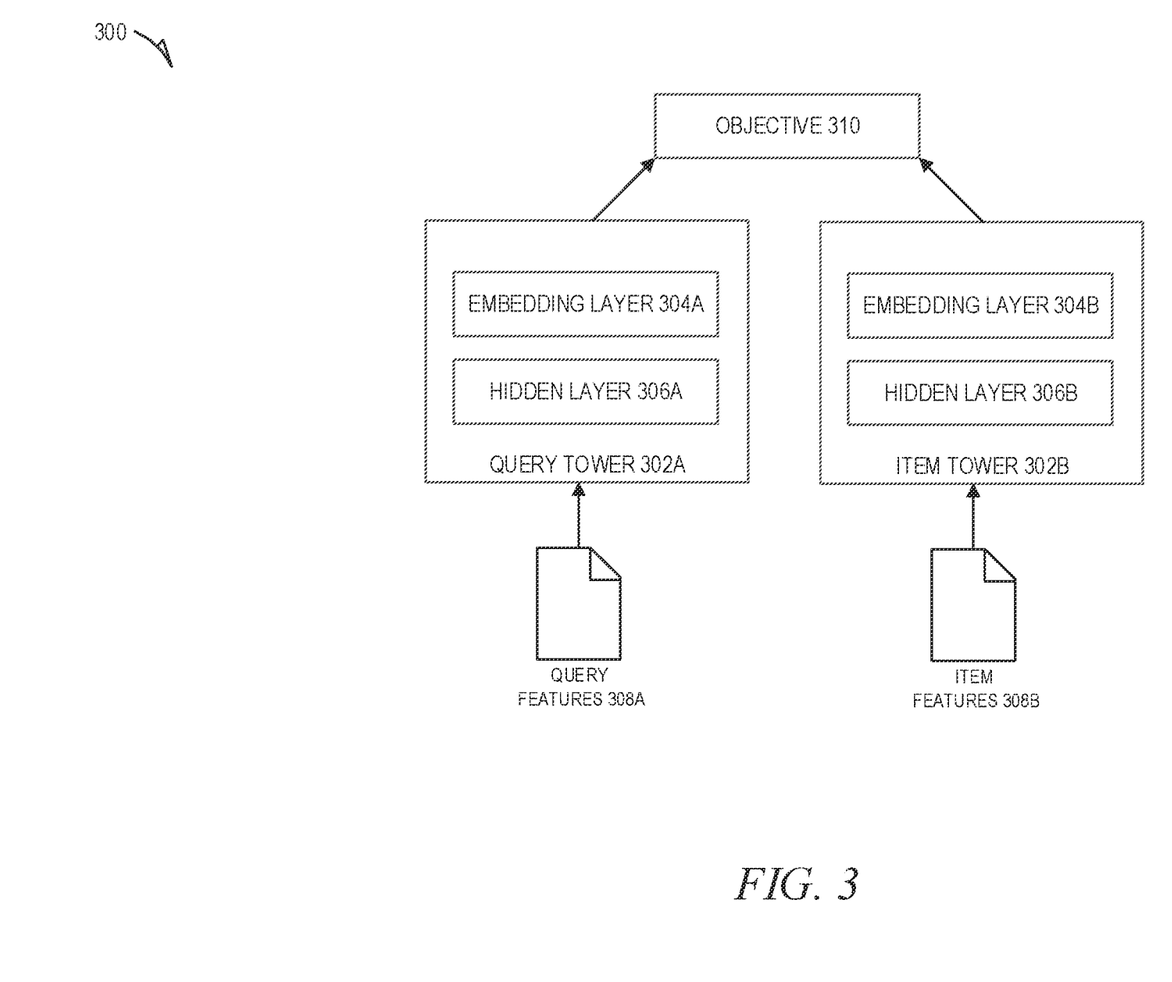
FIG. 3 is a block diagram illustrating a two-tower deep neural network model, in accordance with an example embodiment.

FIG. 3 is a block diagram illustrating a two-tower deep neural network model 300, in accordance with an example embodiment. It should be noted that this is one potential embodiment for a two-tower deep neural network model, but other embodiment are possible as well. There is a query tower 302A, which comprises a first neural network with an embedding layer 304A, hidden layer 306A, and which takes as input query features 308A, and an item tower 302B, which comprises a second neural network with an embedding layer 304B, hidden layer 306B, and which takes as input item features 308B. Given a pair of query and item represented by feature vectors, the query tower 302A and the item tower 302B, respectively, provide embedding functions which encode features of query and item to a k-dimensional embedding space. This is performed by optimizing both towers 302A, 302B towards a single objective 310.

A technical problem, however, is encountered when attempting to extend the two-tower deep neural network model 300 to data that has multiple different types of labels potentially applied to the same piece of data, such as multiple types of interactions. The two-tower deep neural network model 300 is designed to handle only a single type of label. One solution would be to build a separate two-tower deep neural network model 300 for each type of label, and then combine their respective outputs via a utility function to provide a score for each item, which then can be sorted decendingly to provide a ranking. This requires though that each of the item embedding and query embedding processes be performed multiple times for each item or query (once for each label type). This is quite processor-intensive, especially for large training data sets that may comprise millions of pieces of data and interactions. More particularly, each of the two-tower models would yield its top K candidates, which would then need to be evaluated by the models and the probabilities combined by the utility function to yield a final score for each label type.

In an example embodiment, the two-tower deep neural network model 300 is modified to regress not one, but multiple outputs, each corresponding to a score for an event of interest (label), with each event (label) having its own query and item embedding submodel. The advantage of creating a join model across all label types rather than independent models is that these submodels can then share most of their parameters, diverging only in their final layers, yielding embeddings corresponding to each label type.

It should be noted that other embodiments are possible as well where label embeddings are computed by completely independent models with no shared parameters.

Having learned each per-label embedding, the per-item label embeddings can be concatenated into a single per-item vector, and all per-query event embeddings can also be concatenated into a single per-query vector. Each label's corresponding embedding can be multiplied by a weight assigned to the label by a utility function.

For example, if the utility function is Score(Click)+2*Score(Like)+5*Score(Comment), and the click, like, and comment query embeddings are [1, 2], [3, 4], [5, 6], respectively, the concatenated embedding would be: [1, 2, 6, 8, 25, 30]. These can then be used to perform an approximate nearest neighbor search with the effect of finding those items with the highest utility scores. Importantly, this also solves another technical issue with using a different two-towers model for each label type—here the utility function can be changed at any time without retraining the model or reindexing the item embeddings, which allows for both easy manual tuning and autotuning of the utility function to maximize target metrics.

It should be noted that while embodiments are described herein relating to the two-towers deep neural network model, the same techniques can be used with any model that integrates with an approximate k-nearest neighbor function to produce a set of what the k-nearest neighbor function believes are the highest scoring items. Thus, it is not necessary that the query and/or item embedding submodels be neural networks.

It should also be noted that the term "query" shall be interpreted broadly to include both explicit and implicit queries. Examples of explicit queries are those specified either directly or indirectly by a user, such as by the user typing in search terms or by the user selecting one or more filters. Implicit queries are those generated by a system without prompting by a user, such as by the system obtaining the user's profile and then recommending items to the user based on features contained in the profile. Search engines are examples of engines that commonly use explicit queries, whereas feed engines are examples of engines that commonly use implicit queries. It should also be noted that even though a query may be explicit, there may additionally be implicit parts injected into the query. For example, query features for an explicit query may include search terms explicitly specified by a user, as well as features from the user's profile.

It should further be noted that the term "item" shall be interpreted broadly to include any type of object that may be recommended or returned to a user. "Item" is not intended to imply that the object is physical in nature. Examples of items may include web pages, social media posts, articles, books, applications, movies, television programs, etc.

Figure 4:
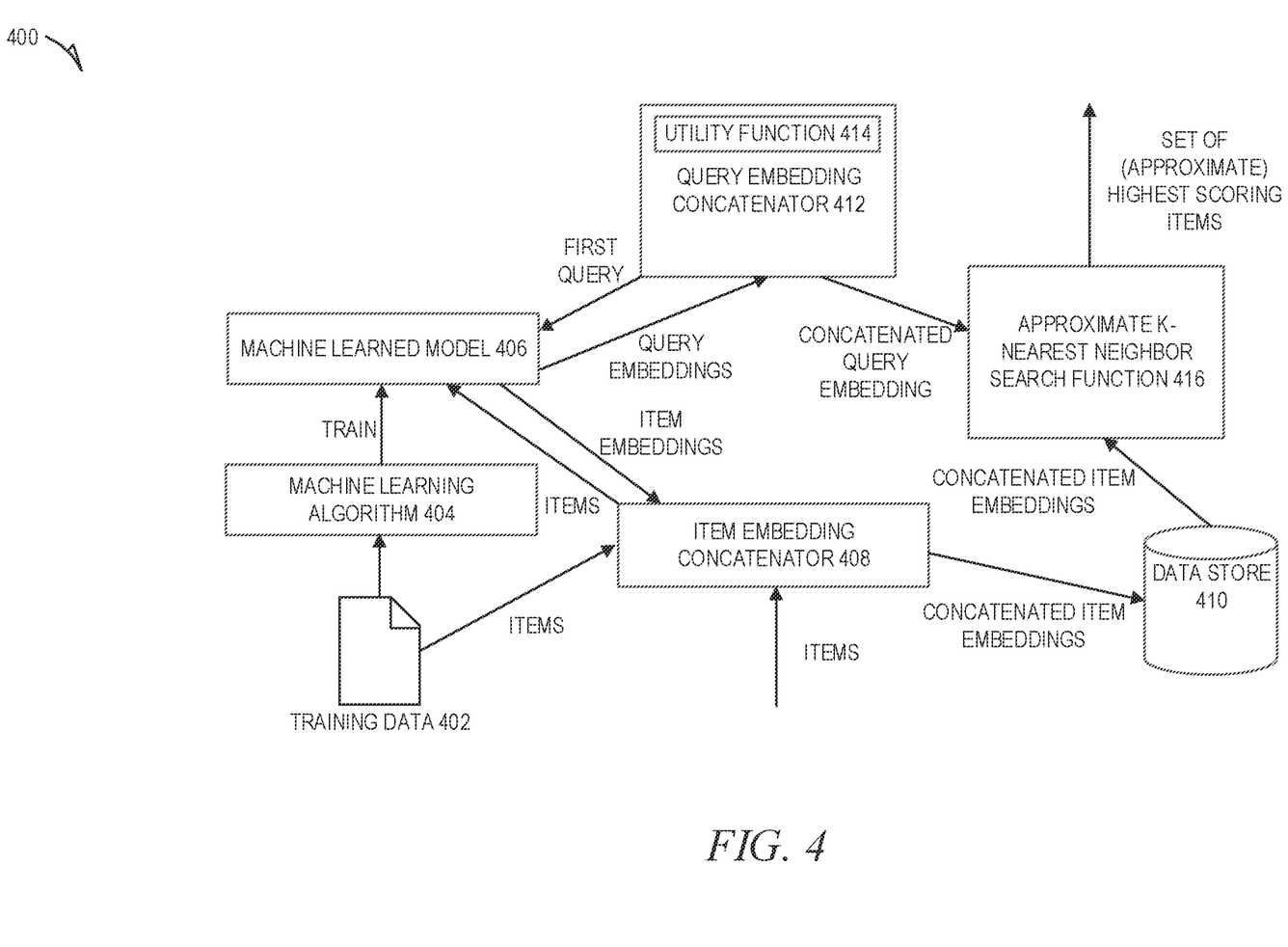
FIG. 4 is a block diagram illustrating a machine learned model architecture in accordance with an example embodiment.

FIG. 4 is a block diagram illustrating a machine learned model architecture 400 in accordance with an example embodiment. In an example embodiment, the machine learned model architecture 400 may be implemented in the application server module 214 of FIG. 2. Also, as briefly mentioned above, while a two-towers model is depicted in this figure, it is not necessary that the model used actually be a two-towers model.

Training data 402 may comprise query features, item features, and a plurality of labels for each query-item combination. Each of these plurality of labels for a single query-item combination may be a different label type. A type of a label refers to a particular meaning or relevancy for a label. For example, one label type may be indicative of whether or not a user has clicked on an item when presented with the item in response to a particular query, with another label type being indicative of whether or not the user has shared the item when presented with the item in response to the particular query, and another label type being indicative of whether or not the user has liked the item when presented with the item in response to the particular query. The label itself may be a value indicating whether or not the meaning or relevancy of the label type should be applied (e.g., a 0 or 1 indicating whether or not the user clicked on the item), or the degree of meaning or relevancy of the label type that should be applied (e.g., a value between 0 and 10 indicating a level of some non-binary aspect being measured by the label type). Other types of labels are possible as well, including non-numeric labels.

The training data 402 may be passed to a machine learning algorithm 404, which may then train a machine learned model 406 using the training data 402. The machine learned model 406 may specifically be trained by learning a function for, for each label in the plurality of labels, embedding each item to which the label pertains, and a function for embedding each query to which the label pertains. In an example embodiment, the machine learned model 406 is a two-towers deep neural network, but in other embodiments other types of neural networks, and indeed other types of non-neural network machine learned models, may be utilized.

An item embedding concatenator 408 then takes items from the training set (as well as potentially items outside the training set) and passes them through the machine learned model 406 to obtain a plurality of item embeddings for each item (one item embedding for each of the plurality of different labels, for each item). It should be noted that what is meant by "passing each item through the machine learned model 406" is that features pertaining to each item are obtained/extracted and passed through the machine learned model 406. For each item, the item embedding concatenator 408 then concatenates the plurality of item embeddings into a single concatenated item embedding. It then stores each of these single concatenated item embeddings in data store 410.

Later, at inference time, a first query is received by a query embedding concatenator 412. As mentioned previously, this query may either be implicitly or explicitly generated. The query embedding concatenator 412 passes the first query through the machine learned model 406 to obtain a plurality of query embeddings for the first query (one query embedding for each of the plurality of different labels). It should be noted that by passing the first query through the machine learned model 406, what is meant is that features pertaining to the first query are obtained/extracted and passed through the machine learned model 406. The query embedding concatenator 412 then concatenates the plurality of query embeddings for the first query into a single concatenated query embedding. Furthermore, the query embedding concatenator 412 contains a utility function 414 that defines a weight to be assigned specifically to each label type. As such, the concatenation may include more than just a bare concatenation, but may include applying the corresponding weight to the query embedding corresponding to a particular label (such as by multiplication of the query embedding by the weight). As described previously, the design of the machine learned model architecture 400 is such that the utility function 414 may be easily altered without requiring that any items or queries be re-embedded. It should be noted, that this method also does not require any embeddings to be reindexed for the purposes of an approximate k-nn search, which would generally be relatively expensive computationally.

To identify the top scoring items, for the first query, from a plurality of items, an approximate k-nearest neighbor search function 416 then obtains the query embedding, as well as item embeddings for each of the plurality of items from the data store 410 and performs an approximate k-nearest neighbor search function on them. The approximate k-nearest neighbor search function 416 operates by finding the k vectors that are closest to a given "query" vector, such as by finding the highest inner product, since finding the highest inner product vectors can be recast as finding the nearest vectors by systematically modifying the vectors.

One solution to this would be to use an exact nearest neighbor approach by computing the distance from the query to every single point in the data set, and return the closest one (or several). This approach is a linear search method, but the computational complexity of the linear search method is O(nd), where n is the size of the dataset and d is the dimensionality. This is quite expensive for large data sets. As such, an approximate nearest neighbor search is used where the closest set of items for a query (in the k-dimensional space, based on the embeddings) are approximated. More particularly, a faster classifier with a slight trade-off in accuracy may be used, using various techniques. There are several different types of approximate k-nearest neighbor search functions used in the art, and for brevity these will not be described in detail here. Examples include classical algorithms such as kd-trees or M-trees, which can simulate approximate k-nearest neighbor search when terminated earlier, techniques that build a graph from the dataset, and using hashing to project data points into lower-dimensional space (using, for example, locality sensitive hashing).

Nevertheless, one should recognize that the term "approximate k-nearest neighbor search" is a term that is known in the art to describe a class of functions used to derive a set of points in a vector space that are closest to a query point (e.g., highest scoring, with respect to the query) that is not necessarily exact when it comes to output. The word "approximate" in this term is not indicative of any sort of indefiniteness in the term itself but reflects that the goal of the function itself is not necessarily to obtain a guaranteed right answer but to come close enough in order to greatly improve the speed of the function. The resulting output is still a prediction of a set of closest or highest scoring points, as best the function can determine without sacrificing speed.

By concatenating the embeddings and utilizing the embeddings in an approximate k-nearest neighbor search function, it becomes possible to gain the benefits of the two-towers deep neural network in environments with multiple types of labels for a single item without needing to implement a different deep neural network for different label types.

In some example embodiments, a cold start problem may exist with this technique. Specifically, for new users who haven't yet used the system significantly, there often is not enough information to score the user's queries effectively (there isn't enough past information about the user's clicks, shares, likes, etc. to accurately predict whether the user will click, share, like, etc. an item). In an example embodiment, the concatenated query embedding for the user can be aggregated with concatenated query embeddings for other users who may be similar to the user. This aggregation may be performed using a weighted average or similar function. "Similar" users may be identified by using fairly little data about the user. For example, in many social networks a user may join based on being requested to join from an existing member, and thus the system may have connection information (e.g., an identification of first degree connections, second degree connections, third degree connections) about a user prior to the user even completing a user profile for the social networking service. The degree of connection may be used as a rough measure of similarity for aggregation purposes. For example, the user's concatenated query embedding may be aggregated with the user's first degree connections' concatenated query embeddings (weighted highly) and with the user's second degree connections' concatenated query embeddings (weighted lower). This aggregated concatenated query embedding can then be used in place of the particular user's concatenated query embedding as input to the approximate k-nearest neighbor search function. Furthermore, by aggregating the query embeddings themselves (in contrast with, for example, aggregating the profiles of similar users and then embedding that aggregation), there is no need to re-embed for each user-group combination, which would be expensive computationally.

Figure 5:
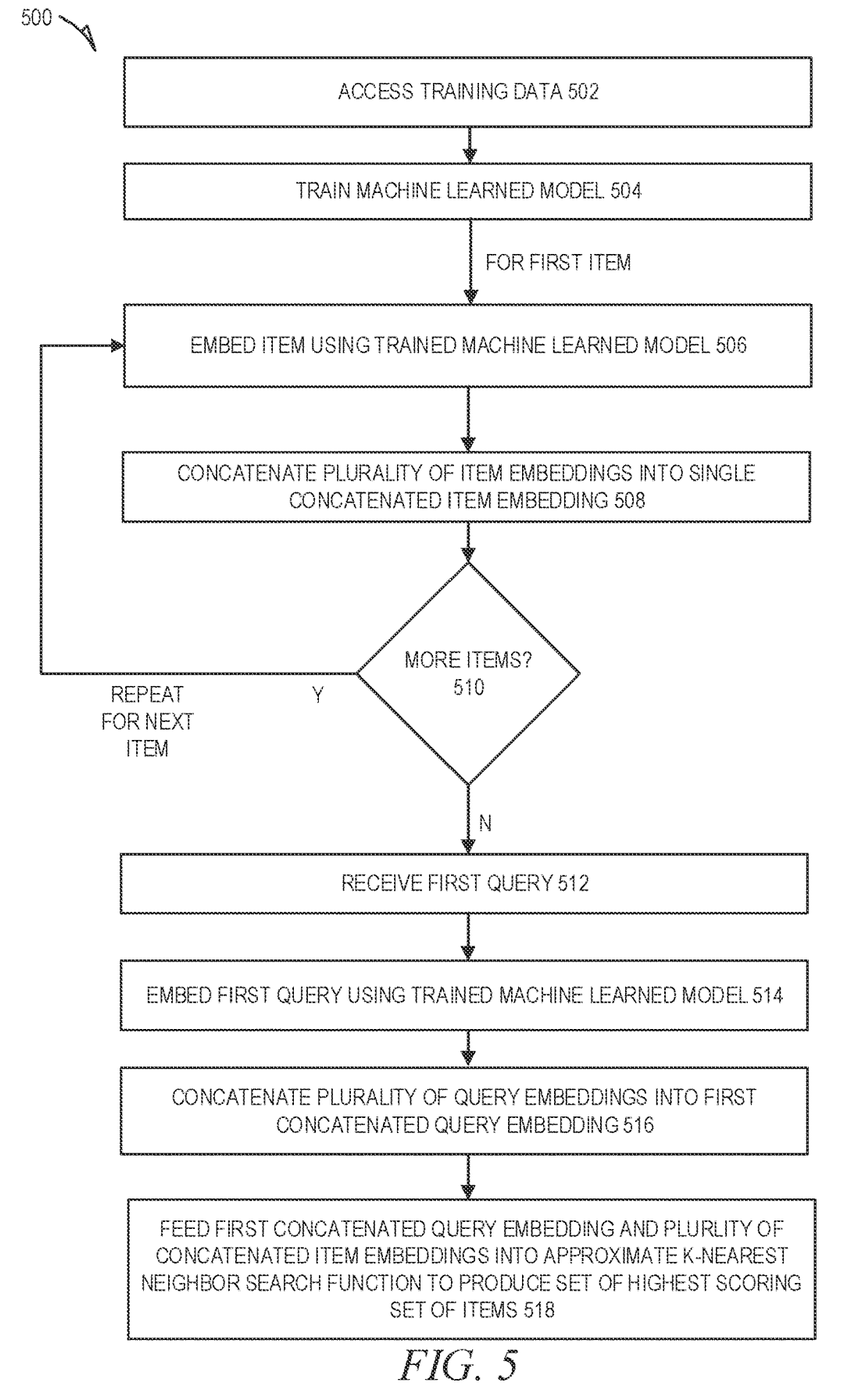
FIG. 5 is a flow diagram illustrating a method for training and using a machine learned model in accordance with an example embodiment.

FIG. 5 is a flow diagram illustrating a method 500 for training and using a machine learned model in accordance with an example embodiment. At operation 502, training data is accessed. The training data includes information about items, information about queries for items, and a plurality of labels for each combination of query and item.

In some example embodiments, the training data may be transformed. This may include, for example, modifying the training data so that it is in a particular format, such as organizing the training data into vectors, and formatting individual features in the vectors into specified formats (e.g., strings with particular character limits, numbers having certain ranges, etc.). In some example embodiments, the transformation may include normalization.

At operation 504, a machine learned model is trained by using a machine learning algorithm to learn, for each label in the plurality of labels, a function for embedding each item to which the label pertains, and a function for embedding each query to which the label pertains. In one example embodiment, this may be performed using a two-towers deep neural network.

Then a loop is begun for each item in the training data. At operation 506, the item is embedded into a plurality of item embeddings using the trained machine learned model. At operation 508, the plurality of item embeddings for the item are concatenated into a concatenated item embedding. At operation 510, it is determined if there are any additional items in the training data. If so, then the method 500 loops back to operation 506 for the next item in the plurality of items. If not, then the method 500 proceeds to operation 512. It should be noted that, while not pictured, the embedding and concatenation performed in operations 506 and 508 may additionally be performed for items not in the training set.

Later, at inference time, at operation 512 a first query is received. At operation 514, the first query is embedded into a plurality of first query embeddings using the trained machine learned model. At operation 516, the plurality of first query embeddings are concatenated into a first concatenated query embedding, by multiplying each first query embedding by a weight assigned specifically to a corresponding label, as defined in a utility function. Then, at operation 518, the first concatenated query embedding and a plurality of item embeddings are fed into an approximate k-nearest neighbor search function, the approximate k-nearest neighbor search function calculating a set of items that the k-nearest neighbor search function has determined to be highest scoring.

Figure 6:
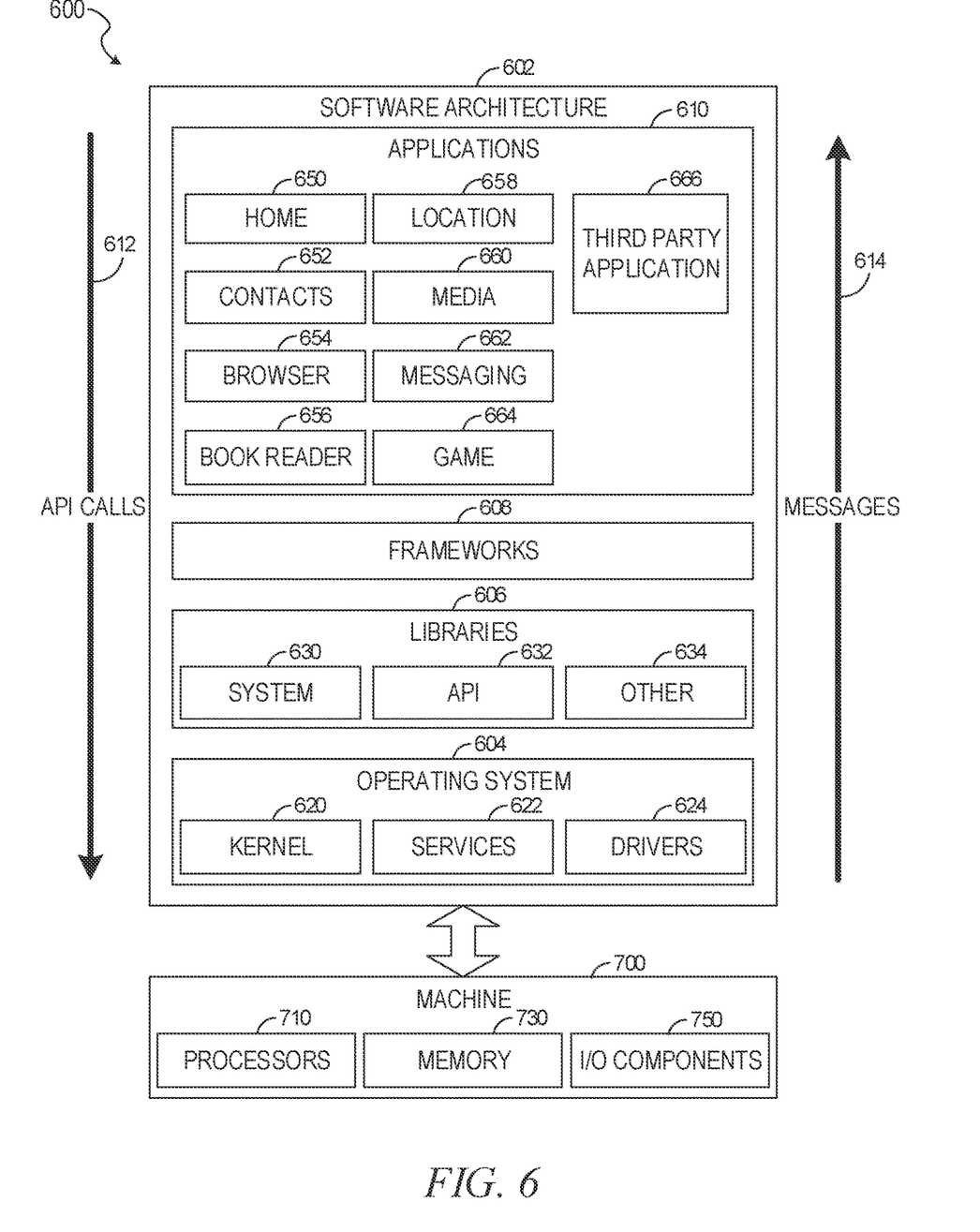
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various GUI functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
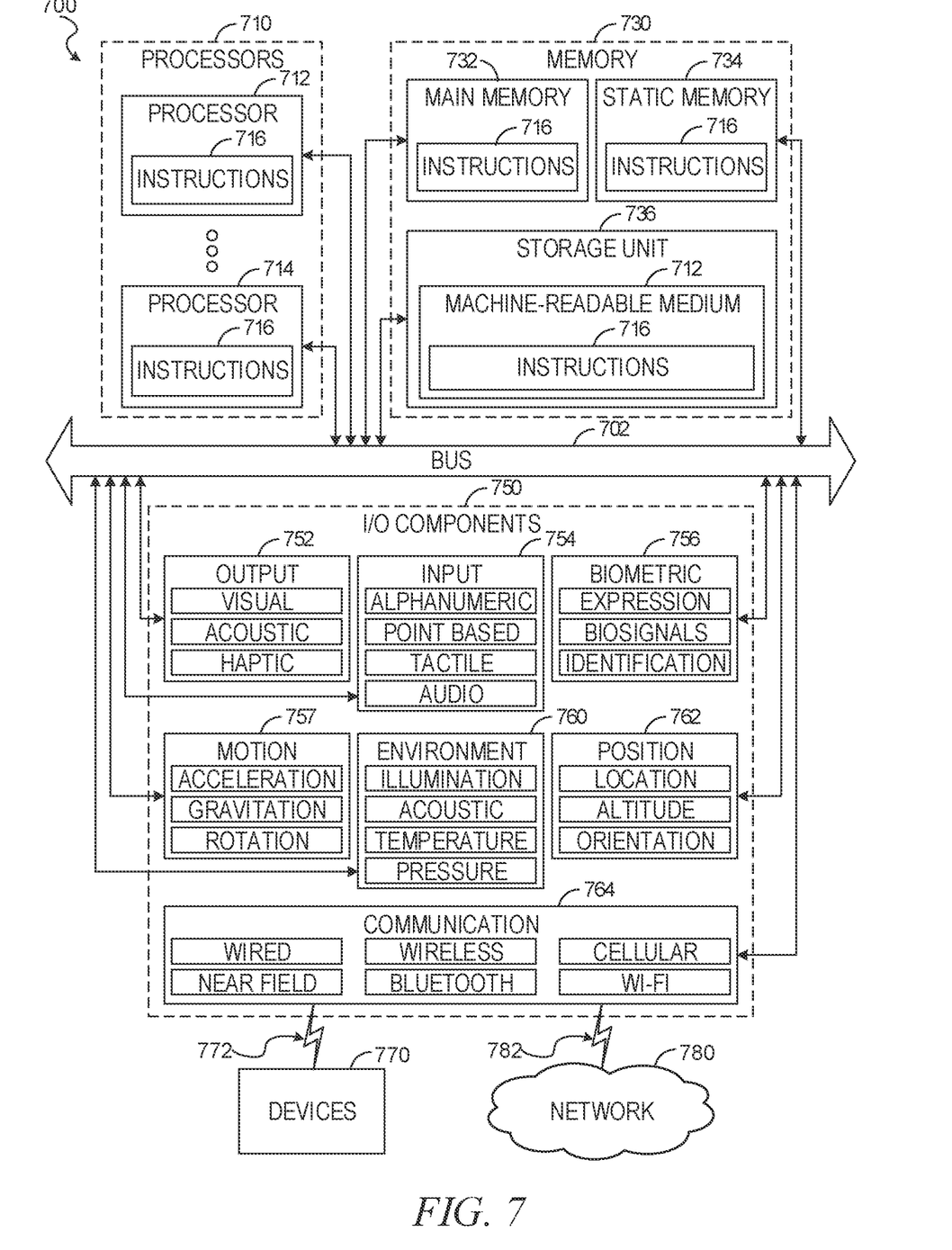
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 757, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 757 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for training and using a machine learned model, comprising:
a processor and memory configured to:
access training data including information about items, information about queries for items, and a plurality of labels for each combination of query and item;
train a machine learned model, the training including learning, for each label in the plurality of labels, a function for embedding each item to which the label pertains, and a function for embedding each query to which the label pertains;
for each item in the training data:
embed the item into a plurality of item embeddings using the trained machine learned model;
concatenate the plurality of item embeddings for the item into a concatenated item embedding;
at inference time:
receive a first query;
embed the first query into a plurality of first query embeddings using the trained machine learned model; and
concatenate the plurality of first query embeddings into a concatenated query embedding, by multiplying each first query embedding by a weight assigned specifically to a corresponding label, as defined in a utility function;
modify the concatenated query embedding based on an aggregation of the concatenated query embedding and one or more concatenated query embeddings of users other than a user corresponding to the first query; and
perform a k-nearest neighbor search function to obtain the concatenated query embedding and one or more concatenated item embeddings and calculate a set of items that the k-nearest neighbor search function has determined to be highest scoring.

2. The system of claim 1, wherein the processor is further configured to perform the embedding of the item and the concatenating of the plurality of item embeddings for one or more items not in the training data.

3. The system of claim 1, wherein the one or more concatenated query embeddings of users other than a user corresponding to the first query are weighted in the aggregation based on degree of connectedness between each corresponding user and the user corresponding to the first query.

4. The system of claim 1, wherein the machine learned model is a deep neural network.

5. The system of claim 4, wherein the deep neural network is a two-towers neural network.

6. The system of claim 5, wherein the two-towers neural network has a first neural network corresponding to queries and a second neural network corresponding to items.

7. The system of claim 1, wherein each item is a feed item and the calculated set of items are included in a display of feed items in a graphical user interface.

8. A computer-implemented method comprising:
accessing training data including information about items, information about queries for items, and a plurality of labels for each combination of query and item;
training a machine learned model, the training including learning, for each label in the plurality of labels, a function for embedding each item to which the label pertains, and a function for embedding each query to which the label pertains;
for each item in the training data:
embedding the item into a plurality of item embeddings using the trained machine learned model;
concatenating the plurality of item embeddings for the item into a concatenated item embedding;
at inference time:
receiving a first query;

embedding the first query into a plurality of first query embeddings using the trained machine learned model;

concatenating the plurality of first query embeddings into a first concatenated query embedding, by multiplying each first query embedding by a weight assigned specifically to a corresponding label, as defined in a utility function;

modifying the first concatenated query embedding based on an aggregation of the first concatenated query embedding and one or more concatenated query embeddings of users other than a user corresponding to the first query; and feeding the first concatenated query embedding and a plurality of item embeddings into an approximate k-nearest neighbor search function, the approximate k-nearest neighbor search function calculating a set of items that the k-nearest neighbor search function has determined to be highest scoring.

9. The method of claim 8, further comprising performing the embedding of the item and the concatenating of the plurality of item embeddings for one or more items not in the training data.

10. The method of claim 8, wherein the one or more concatenated query embeddings of users other than a user corresponding to the first query are weighted in the aggregation based on degree of connectedness between each corresponding user and the user corresponding to the first query.

11. The method of claim 8, wherein the machine learned model is a deep neural network.

12. The method of claim 11, wherein the deep neural network is a two-towers neural network.

13. The method of claim 12, wherein the two-towers neural network has a first neural network corresponding to queries and a second neural network corresponding to items.

14. The method of claim 8, wherein each item is a feed item and the calculated set of items are included in a display of feed items in a graphical user interface.

15. A non-transitory machine-readable storage medium comprising instructions which, when implemented by one or more machines, cause the one or more machines to perform operations comprising:

accessing training data including information about items, information about queries for items, and a plurality of labels for each combination of query and item;

training a machine learned model, the training including learning, for each label in the plurality of labels, a function for embedding each item to which the label pertains, and a function for embedding each query to which the label pertains;

for each item in the training data:
  embedding the item into a plurality of item embeddings using the trained machine learned model;
  concatenating the plurality of item embeddings for the item into a concatenated item embedding;

at inference time:
  receiving a first query;
  embedding the first query into a plurality of first query embeddings using the trained machine learned model;
  concatenating the plurality of first query embeddings into a first concatenated query embedding, by multiplying each first query embedding by a weight assigned specifically to a corresponding label, as defined in a utility function;
  modifying the first concatenated query embedding based on an aggregation of the first concatenated query embedding and one or more concatenated query embeddings of users other than a user corresponding to the first query; and
  feeding the first concatenated query embedding and a plurality of item embeddings into an approximate k-nearest neighbor search function, the approximate k-nearest neighbor search function calculating a set of items that the k-nearest neighbor search function has determined to be highest scoring.

16. The non-transitory machine-readable storage of claim 15, wherein the operations further comprise performing the embedding of the item and the concatenating of the plurality of item embeddings for one or more items not in the training data.

* * * * *